United States Patent
Stesl et al.

(10) Patent No.: US 9,308,840 B2
(45) Date of Patent: Apr. 12, 2016

(54) REMOTE RELEASE SEAT WITH DAMPED FORWARD FOLDING

(71) Applicant: LEAR CORPORATION, Southfield, MI (US)

(72) Inventors: Anton Stesl, Gaimersheim (DE); Christian Verweyst, Munich (DE); Frederic Chevallier, Ingolstadt (DE); Goeran Brkic, Freising (DE); Peter Alexander Wolf, Oberding Schwaig (DE); Ralph Kuschmann, Munich (DE)

(73) Assignee: Lear Corporation, Southfield, MI (US)

( * ) Notice: Subject to any disclaimer, the term of this patent is extended or adjusted under 35 U.S.C. 154(b) by 329 days.

(21) Appl. No.: 14/083,959

(22) Filed: Nov. 19, 2013

(65) Prior Publication Data
US 2014/0138999 A1     May 22, 2014

(30) Foreign Application Priority Data
Nov. 19, 2012 (DE) .......................... 10 2012 221 018

(51) Int. Cl.
    *B60N 2/36*     (2006.01)
(52) U.S. Cl.
    CPC *B60N 2/366* (2013.01); *B60N 2/36* (2013.01); B60N 2205/35 (2013.01); B60N 2205/40 (2013.01)
(58) Field of Classification Search
    CPC ....... B60N 2/2227; B60N 2/168; B60N 2/444
    USPC .............................. 297/378.1, 378.12, 378.13
    See application file for complete search history.

(56) References Cited

U.S. PATENT DOCUMENTS

| | | | |
|---|---|---|---|
| 3,271,811 A | 9/1966 | Flodell | |
| 3,580,635 A * | 5/1971 | Posh ....................... | A47C 1/032 297/362.13 |
| 5,582,453 A * | 12/1996 | Leuchtmann .......... | B60N 2/366 296/65.09 |
| 5,662,369 A * | 9/1997 | Tsuge .................... | B60N 2/366 292/225 |
| 6,450,580 B1 | 9/2002 | Drew et al. | |
| 7,201,425 B2 * | 4/2007 | Tsujibayashi ...... | B60N 2/01583 296/65.05 |

(Continued)

FOREIGN PATENT DOCUMENTS

| | | |
|---|---|---|
| DE | 2223555 A1 | 11/1973 |
| DE | 20215969 U1 | 1/2003 |

(Continued)

OTHER PUBLICATIONS

German Patent and Trademark Office, Office Action for corresponding German Patent Application No. 10 2012 221 018.0 mailed Oct. 27, 2015.
AFD China Intellectual Property Law Office, First Office Action for corresponding Chinese Patent Application No. 201310548233.0 mailed Sep. 21, 2015.

*Primary Examiner* — Sarah McPartlin
(74) *Attorney, Agent, or Firm* — Brooks Kushman P.C.

(57) ABSTRACT

A seat includes a seat base and a seat back that is connected to the seat base by a hinge mechanism for movement between a seating position and a folded forward position. The seat back closes an opening between the passenger compartment and the trunk compartment in the seating position and uncovers the opening in the folded forward position. A spring is operatively connected to the seat back to bias the seat back to the folded forward position. A damper is connected to the seat back that limits the speed that the seat back is folded forward as a result of the biasing force exerted by the spring on the seat back.

15 Claims, 2 Drawing Sheets

(56) References Cited

U.S. PATENT DOCUMENTS

| | | | |
|---|---|---|---|
| 7,344,195 B2 * | 3/2008 | Folkert | B60N 2/206 297/301.4 |
| 7,604,293 B2 | 10/2009 | Matsuhashi | |
| 8,313,147 B2 * | 11/2012 | Scheurer | B60N 2/3013 297/378.12 |
| 8,899,679 B2 * | 12/2014 | Edwards | B60N 2/3013 297/292 |
| 2003/0111879 A1 | 6/2003 | Tak | |
| 2007/0278837 A1 | 12/2007 | White et al. | |
| 2009/0066139 A1 | 3/2009 | Schulz et al. | |
| 2010/0066116 A1 | 3/2010 | Coenen | |

FOREIGN PATENT DOCUMENTS

| | | |
|---|---|---|
| DE | 102005009126 | 9/2006 |
| DE | 202009000783 | 6/2010 |
| DE | 102011018895 | 10/2012 |
| EP | 0854063 | 7/1998 |
| JP | 2002362211 A | 12/2002 |
| JP | 2008295695 A | 12/2008 |
| WO | 2011157324 | 12/2011 |

* cited by examiner

REMOTE RELEASE SEAT WITH DAMPED FORWARD FOLDING

CROSS-REFERENCE TO RELATED APPLICATIONS

This application claims foreign priority benefits under 35 U.S.C. §119(a)-(d) to DE 10 2012 221 018.0, filed Nov. 19, 2012, the disclosure of which is hereby incorporated by reference in its entirety.

TECHNICAL FIELD

This disclosure relates to seat back folding mechanisms for vehicle seats that are remotely released to fold forward.

BACKGROUND

Rear seats may have a seat back that folds forward to provide a larger load floor and cargo area that is accessible from the trunk, or boot, of the vehicle. The seat back is pivotally connected to the seat base and a spring exerts a biasing force on the seat back to fold the seat down in a forward direction.

A problem with remotely released seats that are spring biased to a forwardly folded position is that the seat may fold forward with excessive speed. Uncontrolled movement of the seat back in the passenger compartment is undesirable. Any solution to this problem must be achieved without adding excessive weight, complexity or cost to the vehicle seat.

This disclosure is directed to solving the above problems and other problems as summarized below.

SUMMARY

According to one aspect of this disclosure, a seat is provided for a vehicle having a trunk that defines an opening. The seat comprises a seat base and a seat back that is connected to the seat base by a hinge mechanism for movement between a seating position with the opening being closed by the seat back and a cargo position with the seat being folded forward to uncover an opening to the trunk from a passenger compartment. A spring is operatively connected to the seat back to bias the seat back to fold in a forward direction over the seat base. A damper is connected to the seat back that limits the speed that the seat back is folded forward.

According to other aspects of the disclosure as it relates to a seat, a remote release mechanism that is accessible from the trunk of the vehicle may be used to release the seat back to be folded in the forward direction. The remote release mechanism is connected by a cable to a seat back release mechanism that normally holds the seat back in the seating position.

The damper may be an oil filled cylinder, a piston, and a rod that may be attached to a frame of the seat back. A first end of the rod is attached to the piston that is received in the cylinder. A second end of the rod is pivotally connected to the hinge mechanism.

According to further aspects of the disclosure, the spring may have an operating field that spans a first portion of the range of movement from the seating position to a first intermediate position between the seating position and the cargo position and the damper may have an operating field that spans a second portion of the range of movement from a second intermediate position to the folded position. The operating field of the spring and the operating field of the damper may overlap and both may operate on the seat back during part of the movement of the seat back as the seat back moves from the seating position to the folded forward position and the second portion of the range of movement.

According to another aspect of this disclosure as it relates to a seat back for a vehicle, the seat back may comprise a seat back frame that is pivotable about an axis. A torsion spring is operatively connected to the seat back to exert a biasing force on the seat back frame. A latch may hold the seat back in a seating position and a cable release mechanism may be operated to release the latch. A damper is operatively connected between the seat back and the torsion spring to limit the speed that the torsion spring moves the seat back to the folded forward position.

According to other aspects of this disclosure as it relates to a seat back, a remote latch release that is accessible from a location on the vehicle spaced from the seat back frame may be used to release the seat back frame to the folded forward position. The remote latch release may be connected by a cable to the latch that normally holds the seat back frame in the seating position. The damper may be a cylinder that is filled with a fluid. A piston may be provided that is disposed on a rod. The cylinder may be attached to the back frame and a first end of the rod may be received in the cylinder with a second end of the rod being pivotally connected to the hinge mechanism. The torsion spring may be coaxial with the axis.

According to another aspect of this disclosure, a rear seat is disclosed for use in a vehicle. The rear seat comprises a seat back that is split into at least two portions that are transversely aligned in the cross-vehicle direction. At least two portions of the seat back are selectively movable between a seating position and a folded position. At least two torsion springs are provided with one of the torsion springs being connected to each of the portions of the seat back. Each of the torsion springs is operative to bias one of the portions of the seat back toward the folded position. At least two latches may be each connected to one of the at least two portions to retain that portion of the seat back in the seating position. A release mechanism may be operatively connected to at least one of the latches to release the latch when the rear seat is to be shifted to the folded position. A damper may be operatively connected between at least one of the portions of the seat back and one of the torsion springs to limit the speed that the at least one portion of the seat back is shifted from the seating position to the folded position.

According to still further aspects of this disclosure, a pin may be connected in a fixed relationship with a first portion of the seat back that may be detachable from a second portion of the seat back to allow the first portion of the seat to be placed in the folded position without placing the second portion in the folded position. The pin may be released from the first portion of the seat when the one portion of the seat back is placed in the folded position and the pin is retained by the second portion. The damper is operatively connected to the second portion of the seat to limit the speed that the second portion of the seat back is shifted from the seating position to the folded position. The pin protrudes from the second portion of the seat when the first portion of the seat is shifted from the seating position to the folded position while the second portion of the seat is in the seating position. The pin also protrudes from the second portion of the seat while the second portion of the seat is shifted from the seating position to the folded position.

According to some additional aspects of this disclosure, each of the torsion springs may have an operating field that spans a first portion of the range of movement from the seating position to a first intermediate position between the seating position and the folded position. The damper may have an operating field that spans a second portion of the range of movement between a second intermediate position and the folded position. The first portion of the range of movement and the second portion of the range of movement may overlap and both may operate on the seat back during part of the first portion of the movement of the seat back as the seat back moves from the seating position to the folded forward position.

The above aspects of this disclosure and other aspects will be described below with reference to the attached drawings in the following detailed description of the illustrated embodiment.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
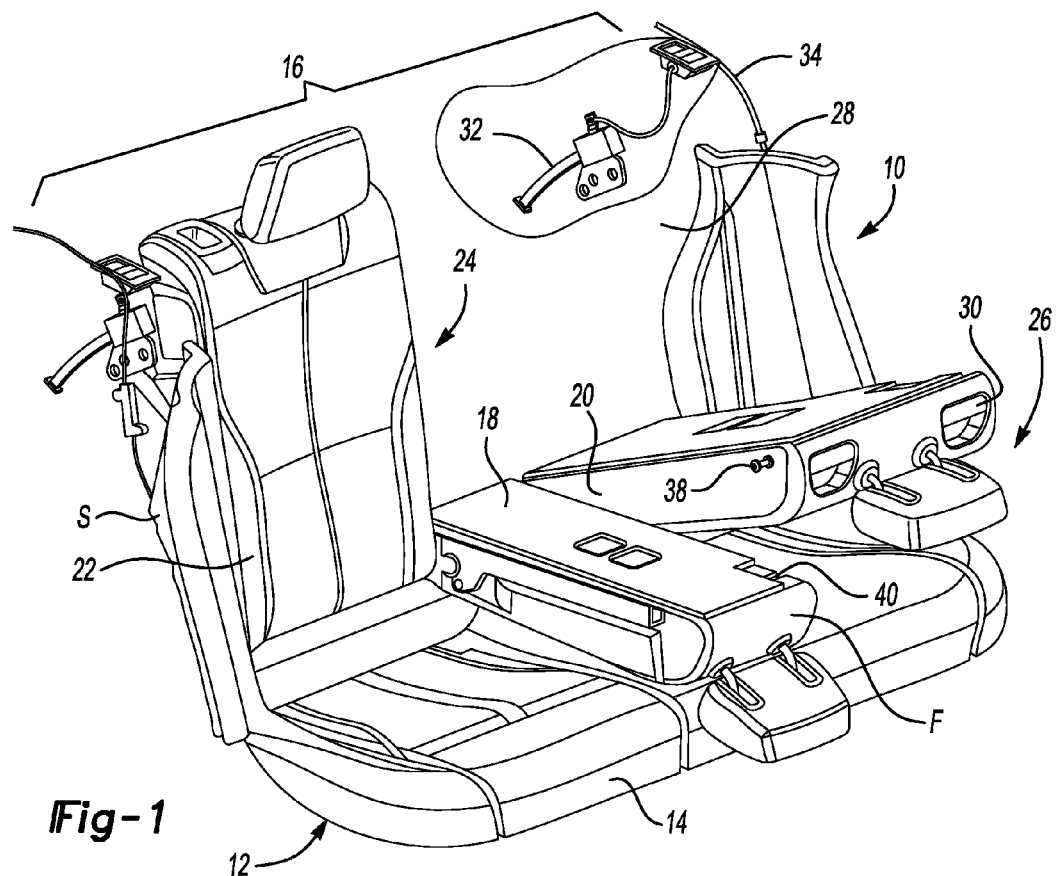
FIG. 1 is a perspective view of a 40/20/40 rear seat with the central 20% portion of a seat back folded forward, one of the 40% portions of the seat back partially folded forward, and one of the 40% portions of the seat back in a seating position.

Referring to FIG. 1, a vehicle 10 is partially shown in conjunction with a seat assembly 12. The seat assembly 12 includes a seat base 14 and a seat back 16. The seat back 16 is movable between a seating position S and a folded forward position F, or cargo position. The illustrated seat back 16 is of the 40/20/40 type in the illustrated embodiment but may be a 50/50 seat, a 60/40 seat, or the like that have two or more portions that are independently movable. The seat back 16 has a center 20% portion 18, a left 40% portion 20, and a right 40% portion 22.

With continued reference to FIG. 1, a trunk compartment 24 is provided behind the seat back 16 in a passenger compartment 26 that defines an opening 28 to the trunk compartment 24. The opening 28 may be used to provide access to the passenger compartment 26 from the trunk compartment 24. The seat back 16 in the seating position S covers the opening 28. The seatback 16 in the folded forward position F permits access through the opening 28 between the trunk compartment 24 and the passenger compartment 26.

Figure 2:
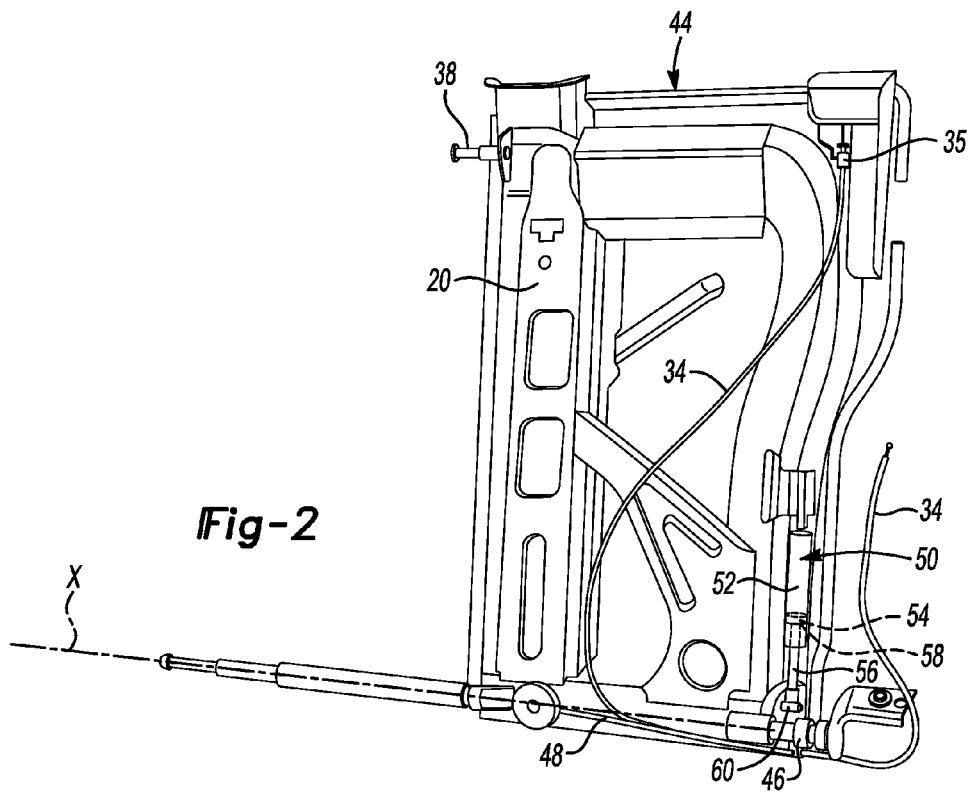
FIG. 2 is a perspective view of a seat back frame including functional components that control repositioning the seat back frame.

A latch 30 is provided proximate the top of the seat back 16 on each of the portions 18, 20, and 22 of the seat back 16. A striker mechanism 32 links the latch 30 to the vehicle body. The striker mechanism 32 is connected by a control cable 34, or Bowden cable, to a remote release mechanism 35 (as shown in FIG. 2). The remote release mechanism 35 may be located in the trunk compartment 24 to facilitate loading the vehicle, including part of the passenger compartment, from the trunk by folding the seat back 16 forward over the seat base 14. The control cable 34 extends between the latch 30 and the remote release mechanism.

A pin 38 is shown extending from the left 40% seat back 20. The pin 38 is received in a receptacle 40 provided on the center 20% seat back 18 when the two seat backs 18, 20 are adjacent to each other in the seating position S or in the folded forward position F. The pin 38 is separated from the receptacle 40 to permit independent movement of the seat back portions 18, 20.

Referring to FIG. 2, a seat back frame 44 of a left 40% seat back 20 is illustrated with the cushion and seat cover material removed. The seat back frame 44 is attached with a hinge mechanism 46 securing the lower end of the seat back frame 44 adjacent the seat base 14. The hinge mechanism is coaxial with a pivot axis X. A spring 48, for example a torsion bar, exerts a biasing force on the seat back frame 44 to urge the seat back frame 44 to move from the seating position S to the folded forward position F. The spring 48 is coaxial with the pivot axis of the hinge mechanism 46.

A damper 50 is provided to limit the speed that the seat back frame 44 moves from the seating position S to the folded forward position F. The damper 50 in the illustrated embodiment includes a cylinder 52 that is partially filled with a fluid such as oil (not shown). A piston 54 is received in the cylinder 52 and is connected to a first end 58 of a rod 56. A second end 60 of the rod 56 is pivotally attached to the hinge mechanism 46. The damper 50 controls the speed of folding of the seat back frame 44. The fluid in the cylinder 52 flows through a restricted orifice to limit the speed at which the rod 56 may be extended or retracted from the cylinder 52 as the seat back frame is moved between the seating position S and the folded forward position F.

Figure 3:
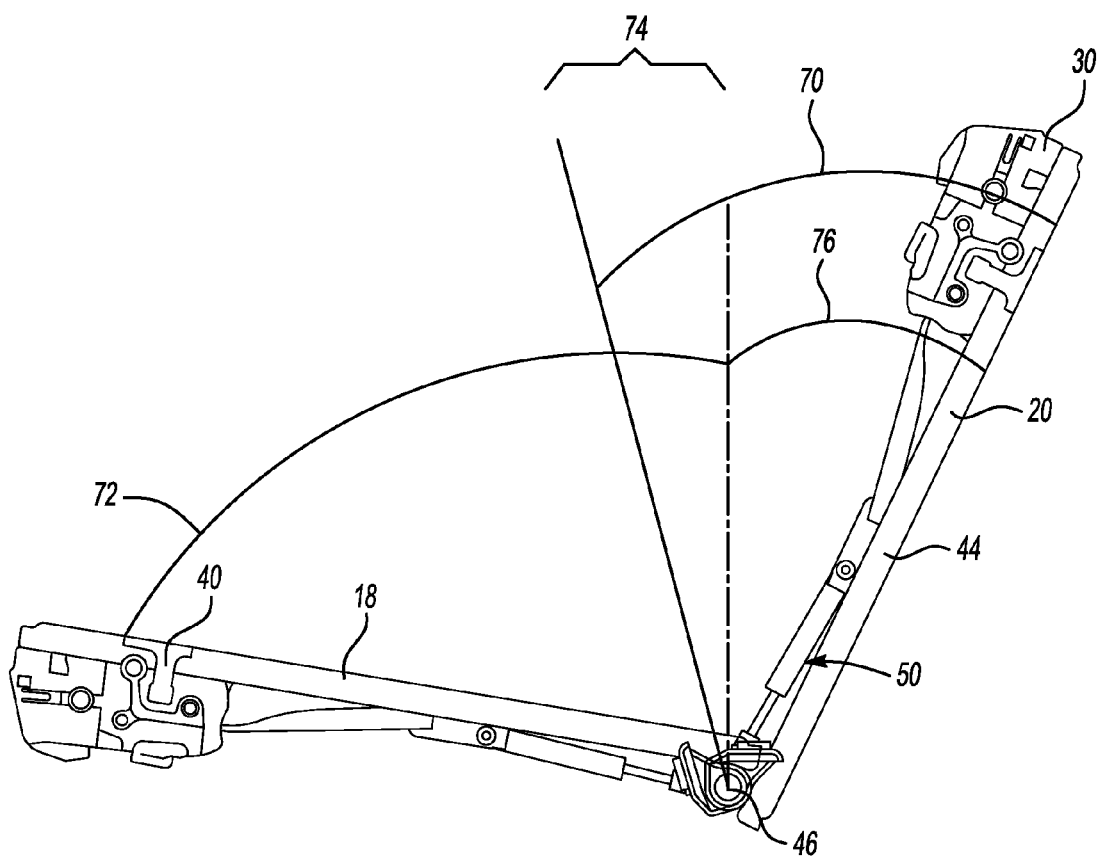
FIG. 3 is a side elevation view of one of the 40% seat back frames in a seating position and the 20% seat back frame in a folded forward position.

Referring to FIG. 3, the operating fields of the seat back frame 44 are illustrated diagrammatically. The operating field of the torsion spring 70 is illustrated by an arcuate line that spans approximately 35° from the seating position toward the folded forward position. In the operating field of the torsion spring 70 the spring moves the seat back frame at maximum speed until the beginning of the operating field of the damper 72. The operating field of the damper 72 spans approximately 81° from the folded forward position to an intermediate point between the seating position S and the folded forward position F. An overlapping area of the two operating fields spans about 10° of each operating fields 70 and 72.

The seat back frame 44 may be set in a range of design positions 76 with the latch locked that may span 25° of the range of motion. The seat back frame 44 may be permanently set at a design position or the angle of the seat back frame may be adjusted to a desired angular orientation with a recliner mechanism (not shown).

When the seat back 20 is released, the spring exerts a force on the seat back 20 to clear the latch 30 and move the seat from the seating position S. As the seat back 20 continues to move toward the folded forward position, the damper 50 acts upon the seat back 20 to limit the speed that the seat back 20 moves toward the folded forward position F.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A seat for a vehicle having a trunk compartment that defines an opening, the seat comprising:
   a seat base;
   a seat back connected to the seat base by a hinge mechanism for movement between a seating position configured to close the opening by the seat back and a cargo position with the seat back being folded in a forward direction to provide access to the opening defined by the trunk compartment from a passenger compartment;
   a spring operatively connected to the seat back to bias the seat back to fold in a forward direction over the seat base; and
   a damper connected to the seat back that limits a speed that the seat back is folded forward; wherein the damper is an oil filled cylinder, a piston, and a rod, wherein the oil filled cylinder is attaches to a frame of the seat back, a first end of the rod is attached to the piston that is received in the cylinder, a second end of the rod being pivotally connected to the hinge mechanism.

2. The seat of claim 1 further comprising a remote release mechanism that is accessible from the trunk compartment of the vehicle that releases the seat back to be folded in the forward direction, wherein the remote release mechanism is connected by a cable to a seat back release mechanism that normally holds the seat back in the seating position.

3. The seat of claim 1 wherein the spring has an operating field that spans a first portion of the range of movement from the seating position to a first intermediate position between the seating position and the cargo position and the damper has an operating field that spans a second portion of the range of movement from a second intermediate position to the cargo position.

4. The seat of claim 3 wherein the operating field of the spring and the operating field of the damper overlap and both the spring and the damper operate on the seat back during part of the movement of the seat back as the seat back moves from the seating position to the cargo position.

5. The seat of claim 4 wherein the operating field of the spring is limited to about 35° and the operating field of the damper is limited to about 81°.

6. A seat back for a vehicle, comprising:
   a seat back frame that pivots about an axis;
   a torsion spring operatively connected to the seat back to exert a biasing force on the seat back frame;
   a latch that holds the seat back in a seating position;
   a cable release mechanism that is operated to release the latch; and
   a damper operatively connected between the seat back and the torsion spring to limit a speed that the torsion spring moves the seat back to a folded forward position, wherein the damper is a cylinder that is filled with a fluid.

7. The seat back of claim 6 further comprising a remote latch release that is accessible from a location on the vehicle spaced from the seat back frame that releases the seat back frame to the folded forward position.

8. The seat back of claim 7 wherein the remote latch release is connected by a cable to the latch that normally holds the seat back frame in the seating position.

9. The seat back of claim 6 wherein the cylinder is attached to the seat back frame and a first end of a rod is received in the cylinder with a second end of the rod being pivotally connected to a hinge mechanism.

10. The seat back of claim 9 wherein the torsion spring is coaxial with the axis.

11. A rear seat for a vehicle, comprising:
    a seat back split into at least two portions that are transversely aligned in a cross-vehicle direction, wherein the at least two portions of the seat back are each selectively movable between a seating position and a folded position;
    a pin connected in a fixed relationship with a first portion of the seat back, and wherein the pin is detachable from a second portion of the seat back to allow the first portion of the seat to be placed in the folded position without placing the second portion in the folded position;
    at least two torsion springs with one of the torsion springs being connected to each of the portions of the seat back, and wherein each of the torsion springs is operative to bias one of the portions of the seat back toward the folded position;
    at least two latches with each being connected to one of the at least two portions to retain that portion of the seat back in the seating position;
    a release mechanism operatively connected to at least one of the latches to release at least one latch when the rear seat is to be shifted to the folded position; and
    a damper operatively connected between at least one of the portions of the seat back and one of the torsion springs to limit a speed that one of the at least two portions of the seat back is shifted from the seating position to the folded position, wherein the pin is released from the first portion of the seat when one portion of the seat back is placed in the folded position and the pin is retained by the second portion, wherein the damper is operatively connected to the second portion of the seat to limit a speed that the second portion of the seat back is shifted from the seating position to the folded position.

12. The rear seat of claim 11 wherein the pin protrudes from the second portion of the seat when the first portion of the seat is shifted from the seating position to the folded position while the second portion of the seat is in the seating position.

13. The rear seat of claim 12 wherein the pin protrudes from the second portion of the seat while the second portion of the seat is shifted from the seating position to the folded position.

14. The rear seat of claim 11 wherein each of the torsion springs has an operating field that spans a first portion of the range of movement from the seating position to a first intermediate position between the seating position and the folded position and the damper has an operating field that spans a second portion of the range of movement from a second intermediate position and to a folded position.

15. The rear seat of claim 14 wherein the operating field of the spring and the operating field of the damper overlap and both the spring and the damper operate on the seat back during part of the movement of the seat back as the seat back moves from the seating position to the folded position.

* * * * *